US011960330B2

(12) United States Patent
Hashikura

(10) Patent No.: US 11,960,330 B2
(45) Date of Patent: Apr. 16, 2024

(54) ELECTRONIC APPARATUS

(71) Applicant: LENOVO (SINGAPORE) PTE. LTD., Singapore (SG)

(72) Inventor: Makoto Hashikura, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 102 days.

(21) Appl. No.: 17/656,454

(22) Filed: Mar. 25, 2022

(65) Prior Publication Data

US 2022/0374053 A1 Nov. 24, 2022

(30) Foreign Application Priority Data

May 19, 2021 (JP) ................................. 2021-084686

(51) Int. Cl.
*G06F 1/16* (2006.01)
(52) U.S. Cl.
CPC ................................. *G06F 1/1681* (2013.01)
(58) Field of Classification Search
None
See application file for complete search history.

(56) References Cited

U.S. PATENT DOCUMENTS

| 6,212,069 B1* | 4/2001 | Janik | G06F 1/1637 |
| | | | 361/679.55 |
| 7,447,003 B2* | 11/2008 | Yang | G06F 1/166 |
| | | | 361/679.01 |
| 10,852,775 B1* | 12/2020 | Kim | E05D 3/02 |
| 2017/0075380 A1 | 3/2017 | Park et al. | |

FOREIGN PATENT DOCUMENTS

| JP | 08076886 A | 3/1996 |
| JP | 11006998 A | 1/1999 |
| JP | 2003029241 A | 1/2003 |
| JP | 2005183425 A | 7/2005 |
| JP | 2006139538 A | 6/2006 |
| JP | 5330566 | 10/2013 |
| JP | 2021060070 A | 4/2021 |

* cited by examiner

*Primary Examiner* — Anthony Q Edwards
*Assistant Examiner* — Rashen E Morrison
(74) *Attorney, Agent, or Firm* — SHIMOKAJI IP

(57) ABSTRACT

An electronic apparatus includes a main body chassis and a display chassis that are rotatably connected at connecting edges via a hinge. The display chassis has a display, a back cover covering the rear face of the display, and a pair of reinforcing plates extending along edge walls, each reinforcing plate having a proximal end fixed to the back cover together with a connecting plate of the hinge at the connecting edge and having a front face fixed to the display and a rear face fixed to the back cover. The back cover includes a main plate having a curved shape that is convex toward rear; and an injection-molded resin frame around the main plate and having a flat surface. The reinforcing plates are fixed to the flat surface.

8 Claims, 11 Drawing Sheets

ELECTRONIC APPARATUS

TECHNICAL FIELD

The present disclosure relates to an electronic apparatus, including a main body chassis and a display chassis that are rotatably connected at their connecting edges via a hinge.

BACKGROUND

A laptop PC typically includes a main body chassis and a display chassis that are rotatably connected at their connecting edges via a hinge. The display chassis has a display and a back cover that covers the rear face of the display. When rotating the display chassis relative to the main body chassis, the user may push the top end of the display chassis with their hand for movement.

SUMMARY

An electronic apparatus according to one aspect of the present disclosure includes: a main body chassis and a display chassis that are rotatably connected at connecting edges thereof via a hinge. The display chassis has: a display having a display surface and a rear face, the display surface facing front; a back cover that covers the rear face of the display; and a pair of reinforcing plates extending along side edges on both left and right sides of the display chassis, each reinforcing plate having a proximal end that is fixed to the back cover together with a connecting plate of the hinge at the connecting edge and having a front face fixed to the display and a rear face fixed to the back cover.

DETAILED DESCRIPTION

The following describes an electronic apparatus according to one embodiment of the present disclosure in details, with reference to the drawings. The present disclosure is not limited to the following embodiment.

In a typical laptop PC, the back cover of a display chassis maintains the strength of the display chassis. However, the back cover may have a reduced thickness due to the demand for thinner electronic apparatuses. In addition, while the ratio of the width to the height of the display has been conventionally 16:9 in most cases, the ratio is changing to 16:10 recently, which has additional height. As a result, the back cover tends to bend when the display chassis is rotated relative to the main body chassis, resulting in poor usability. The bent and curved back cover may come in unevenly contact with a part of the rear face of the display, which may cause stress on the display.

When rotating the display chassis relative to the main body chassis, the bending stress tends to concentrate on and around the attachment part with the hinge. Particularly, large stress occurs at a back cover that is vertically long, making it difficult for a thinner back cover to keep enough strength. This may reduce the life of the component.

Figure 1:
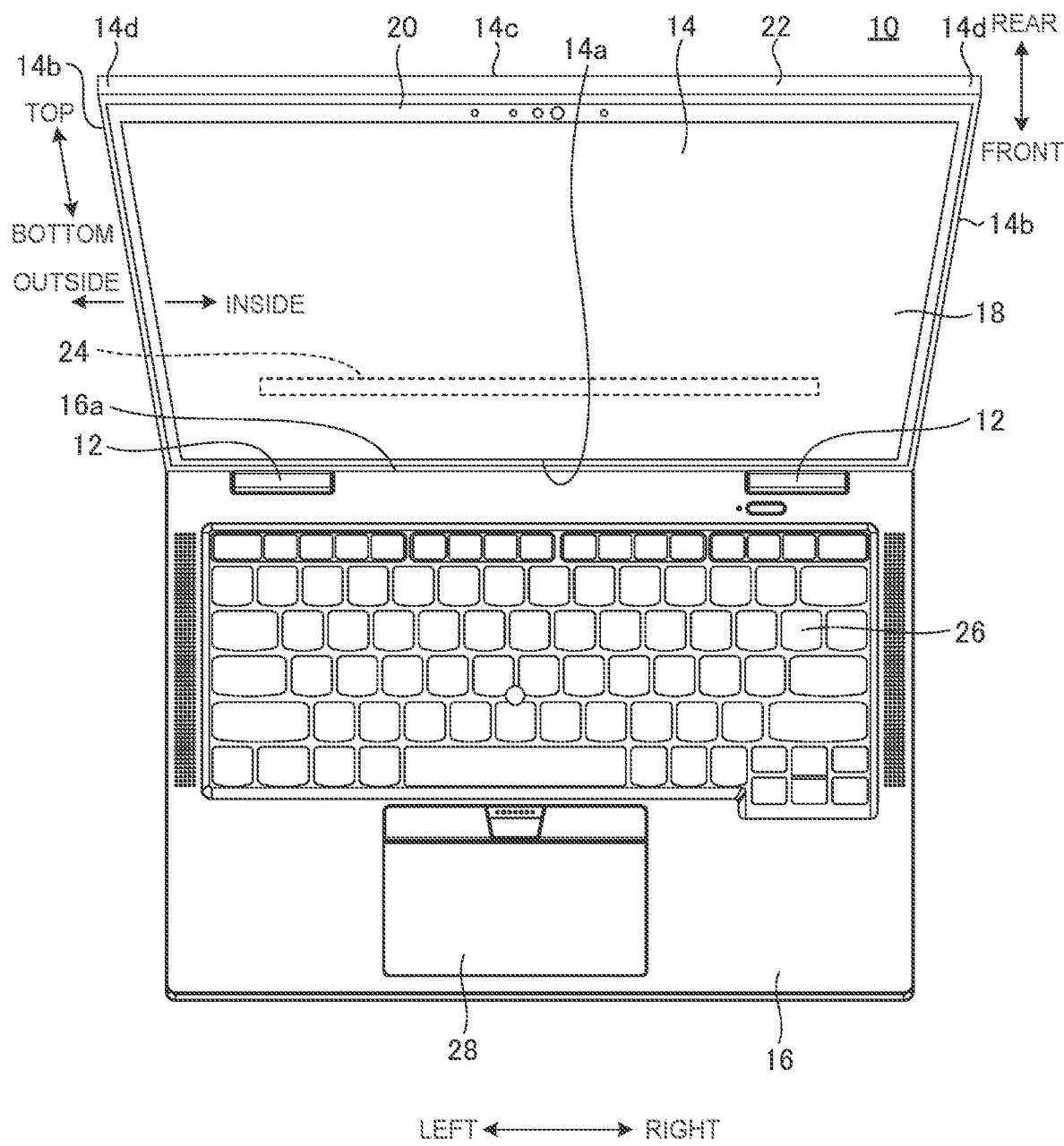
FIG. 1 is a perspective view of an electronic apparatus according to one embodiment.

In this regard, FIG. 1 is a perspective view of an electronic apparatus 10 according to one embodiment of the present disclosure. FIG. 1 illustrates a display chassis 14 that is open relative to a main body chassis 16 via a hinge 12.

As illustrated in FIG. 1, the electronic apparatus 10 includes the display chassis 14 and the main body chassis 16 that are rotatably connected at their connection edge 14a and connection edge 16a via a pair of left and right hinges 12, 12. The connection edge 14a is at the bottom end of the display chassis 14, and the connection edge 16a is at the rear end of the main body chassis 16. The main body chassis 16 is like a thin rectangular box. The main body chassis 16 accommodates a keyboard 26 and a touchpad 28 on the top face. The bottom face of the main body chassis 16 is covered with a bottom-face cover 30.

Hereinafter, the following describes the display chassis 14 and its components while referring to the direction toward the connection edge 14a as bottom, the opposite direction as top, the direction toward the display surface of a display 18 as front, and the opposite direction as rear. For a reinforcing plate 42 described later, the bottom is referred to as a proximal end, and the top is referred to as a distal end. For the structure of the left end of the display chassis 14 and its components, the left may be referred to as outside and the right may be referred to as inside. In the drawings, these directions are indicated by arrows as appropriate.

Figure 2:
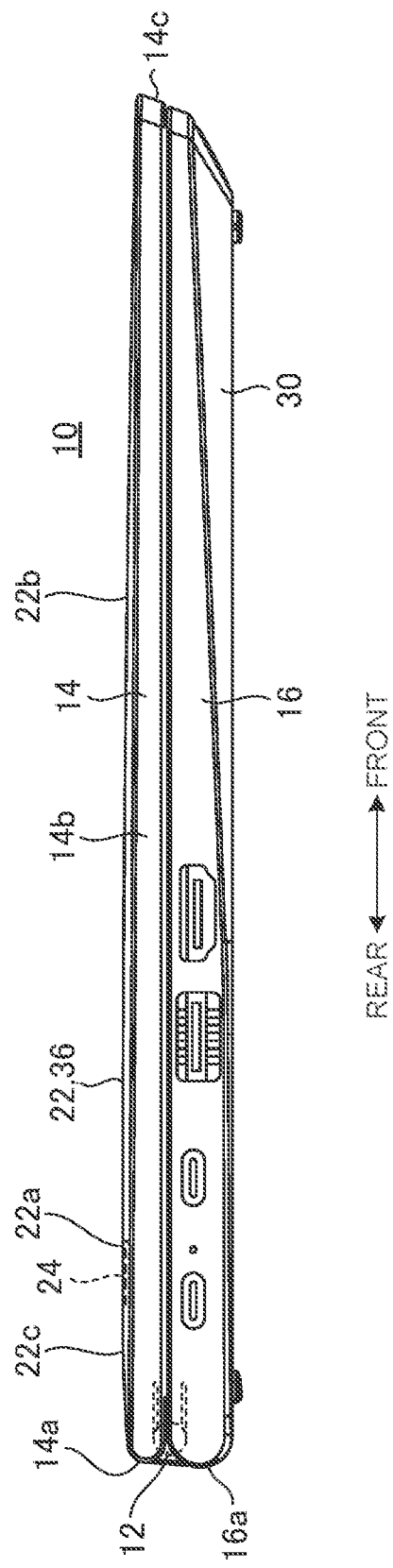
FIG. 2 is a side view of the electronic apparatus when the display chassis is closed.
Figure 3:
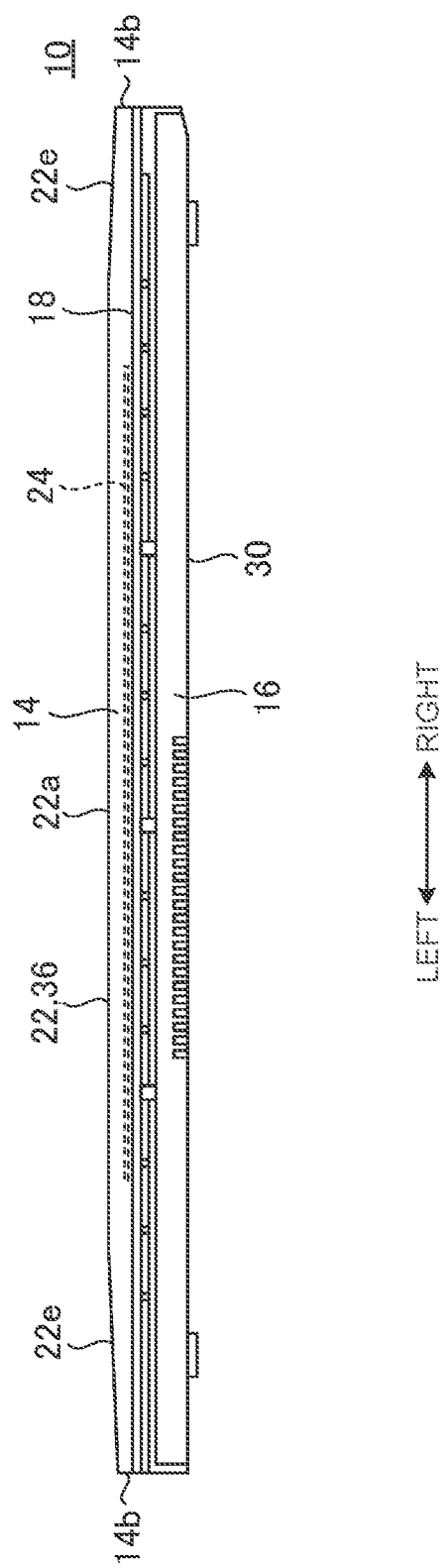
FIG. 3 is a front view of the electronic apparatus when the display chassis is closed.
Figure 4:
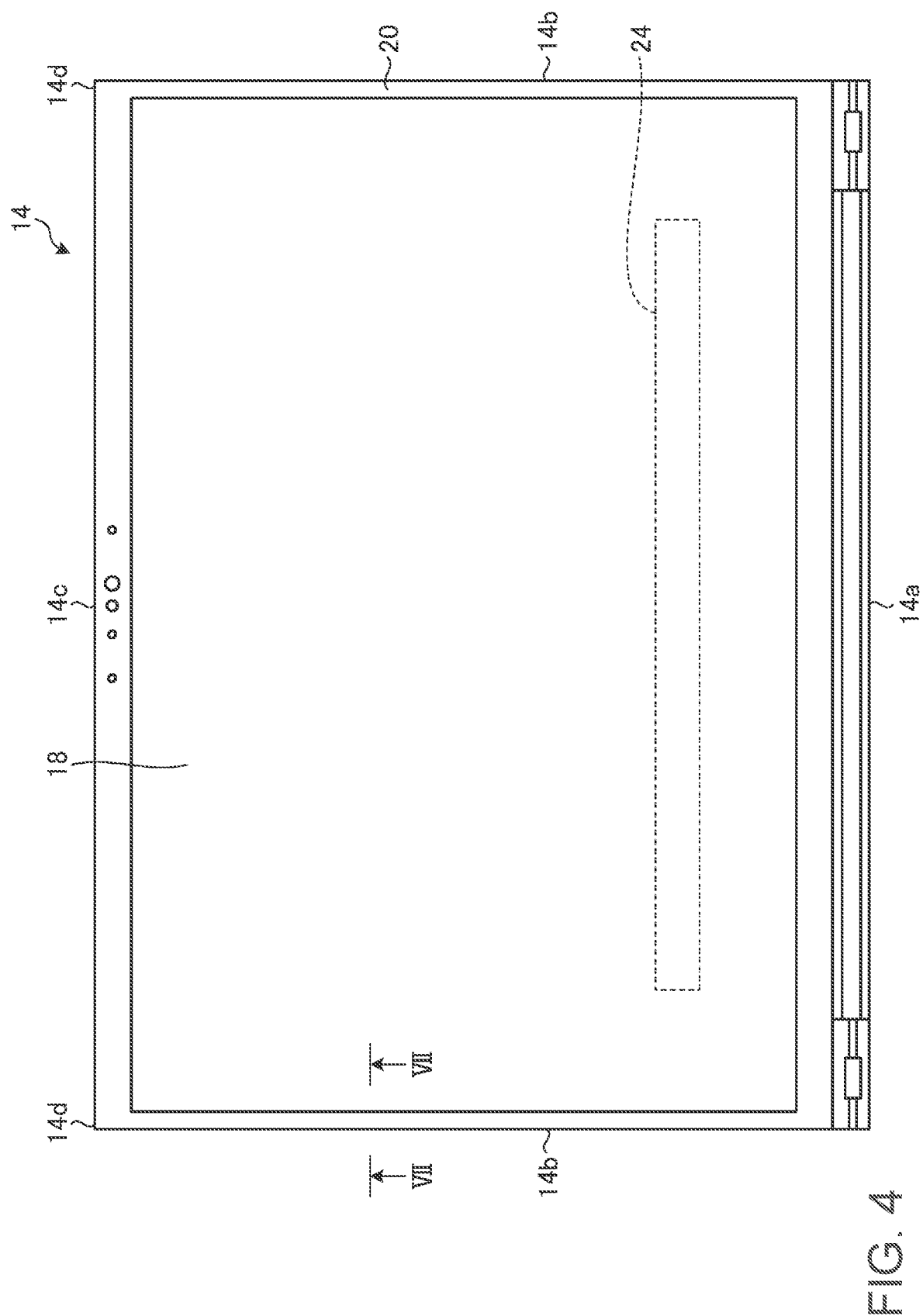
FIG. 4 is a front view of the display chassis.

FIG. 2 is a side view of the electronic apparatus 10 when the display chassis 14 is closed. FIG. 3 is a front view of the electronic apparatus when the display chassis 14 is closed. FIG. 4 is a front view of the display chassis 14.

As illustrated in FIGS. 2 to 4, the display chassis 14 is like a thin rectangular box. The display 18 is placed on the front face of the display chassis 14. In one example, the display 18 is a liquid crystal display of a touch-screen type. The display chassis 14 is electrically connected to the main body chassis 16 via cable passing through the hinges 12.

The display chassis 14 further includes a front frame 20 that surrounds the periphery of the front face of the display 18, a back cover 22 that covers the rear face of the display 18 (the face opposite to the display surface), and a display controller 24 placed between the display 18 and the back cover 22 to control the display 18.

The display controller 24 is a component that controls the display 18 at least partially. In one example, the display controller 24 is a timing controller for displaying on the display 18. The graphics function section, the display memory, and the like required for display control may be provided on the main board of the main body chassis 16 or on the display controller 24. When the display 18 is of a touch screen type, the display controller 24 may include some or all of the functions of its touch control. The display controller 24 is thin and long in the left-right direction.

To place the display controller 24 between the back cover 22 and the display 18, the back cover 22 has a slightly convex curved shape toward the rear. Specifically, in the side view (see FIG. 2), the back cover 22 has height that is highest at the top 22a, where the display controller 24 is stored, and has a sloping face 22b that descends toward the front and a sloping face 22c that descends toward the rear. In the front view (see FIG. 3), the back cover 22 has height that is highest and flat at the top 22a, and has sloping faces 22e that descend to the left and right. The display controller 24 is a moderately thin component, and each sloping face 22b to 22e has a gentle slope. Each sloping face 22b to 22e has a continuous curved surface. Thus, the back cover 22 has a substantially dome shape with the top 22a being the highest.

Figure 5:
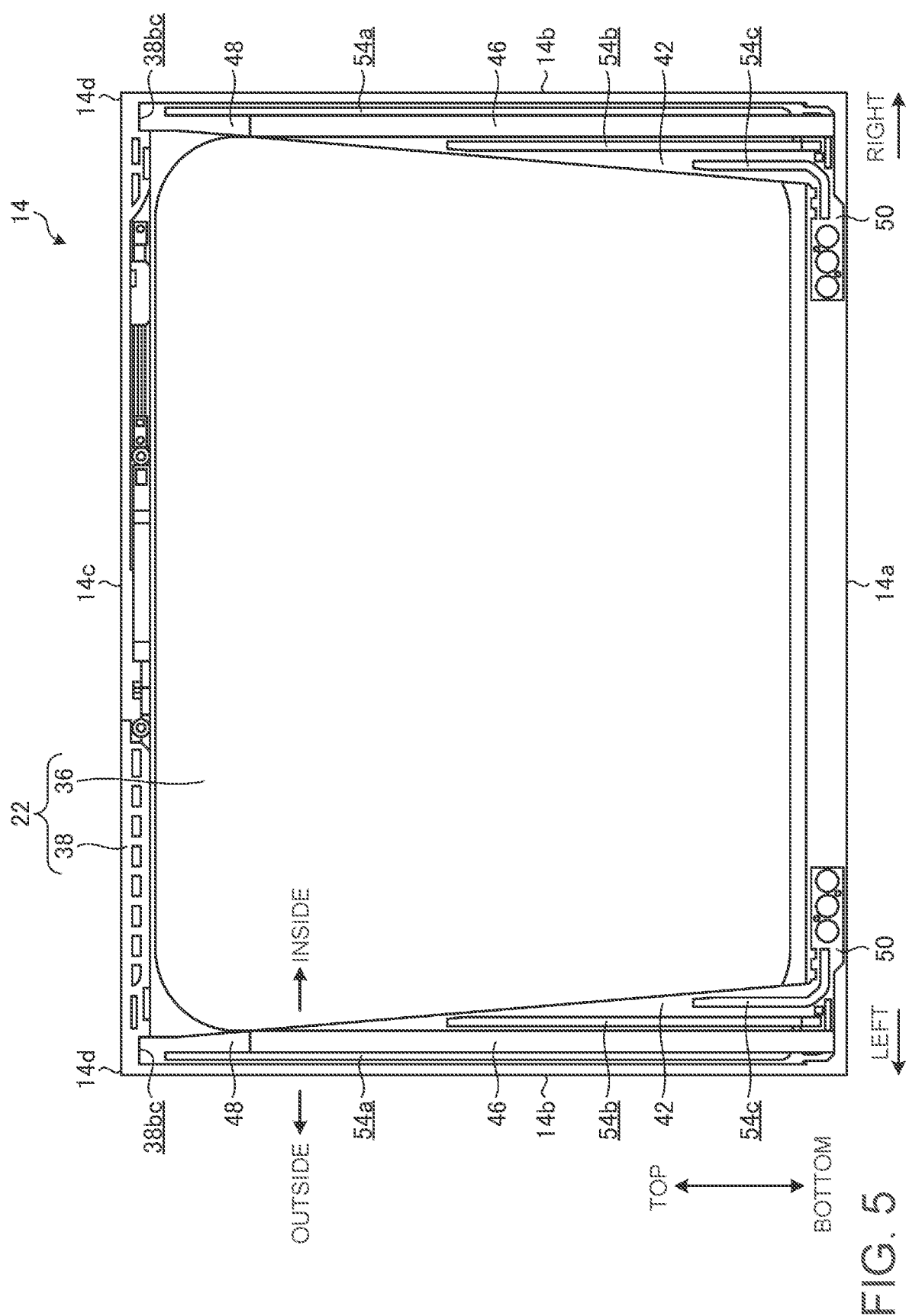
FIG. 5 is a front view of the display chassis with the display, the front frame, and the display controller removed.
Figure 6:
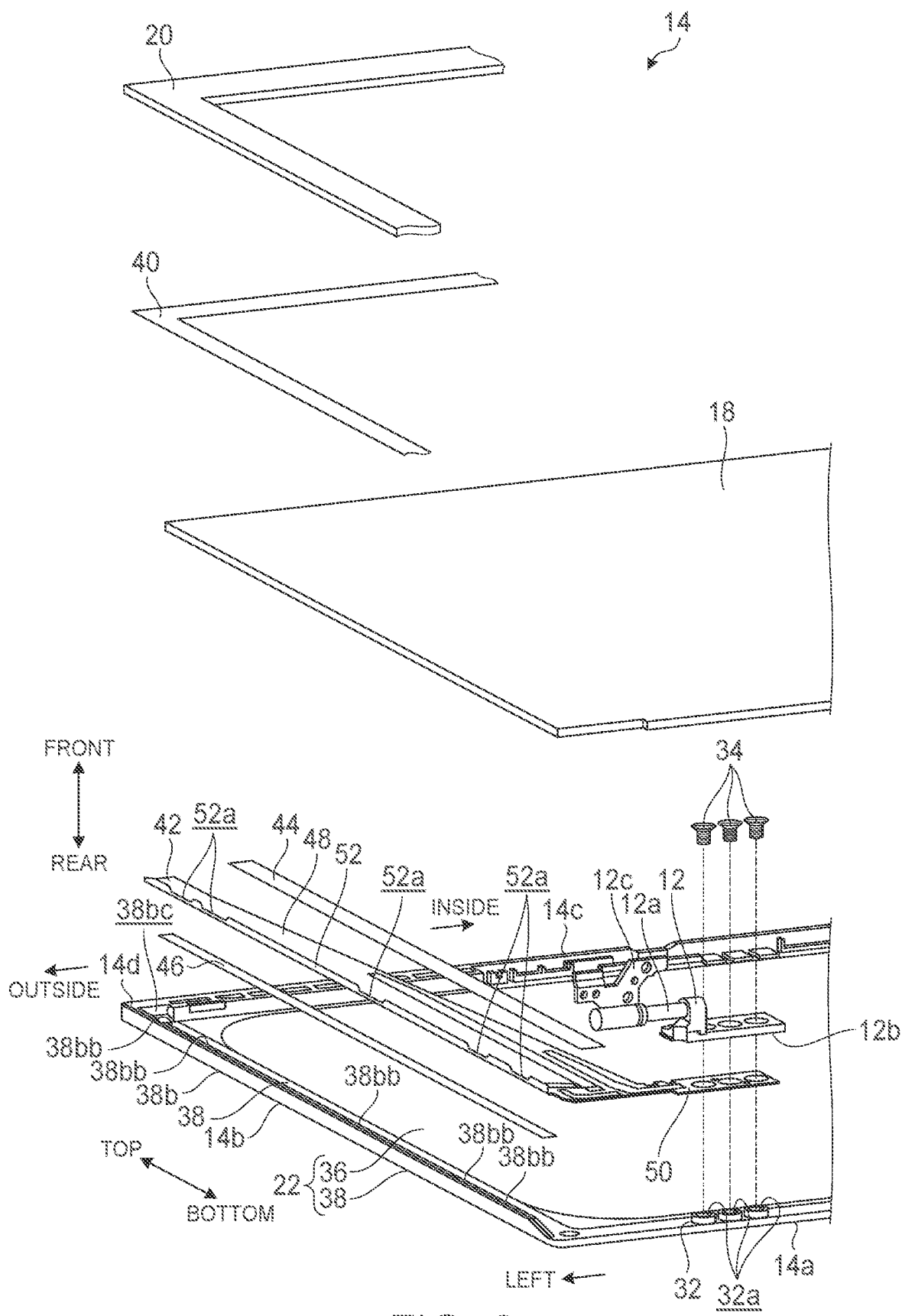
FIG. 6 is a partially enlarged and exploded perspective view of the display chassis.
Figure 7:
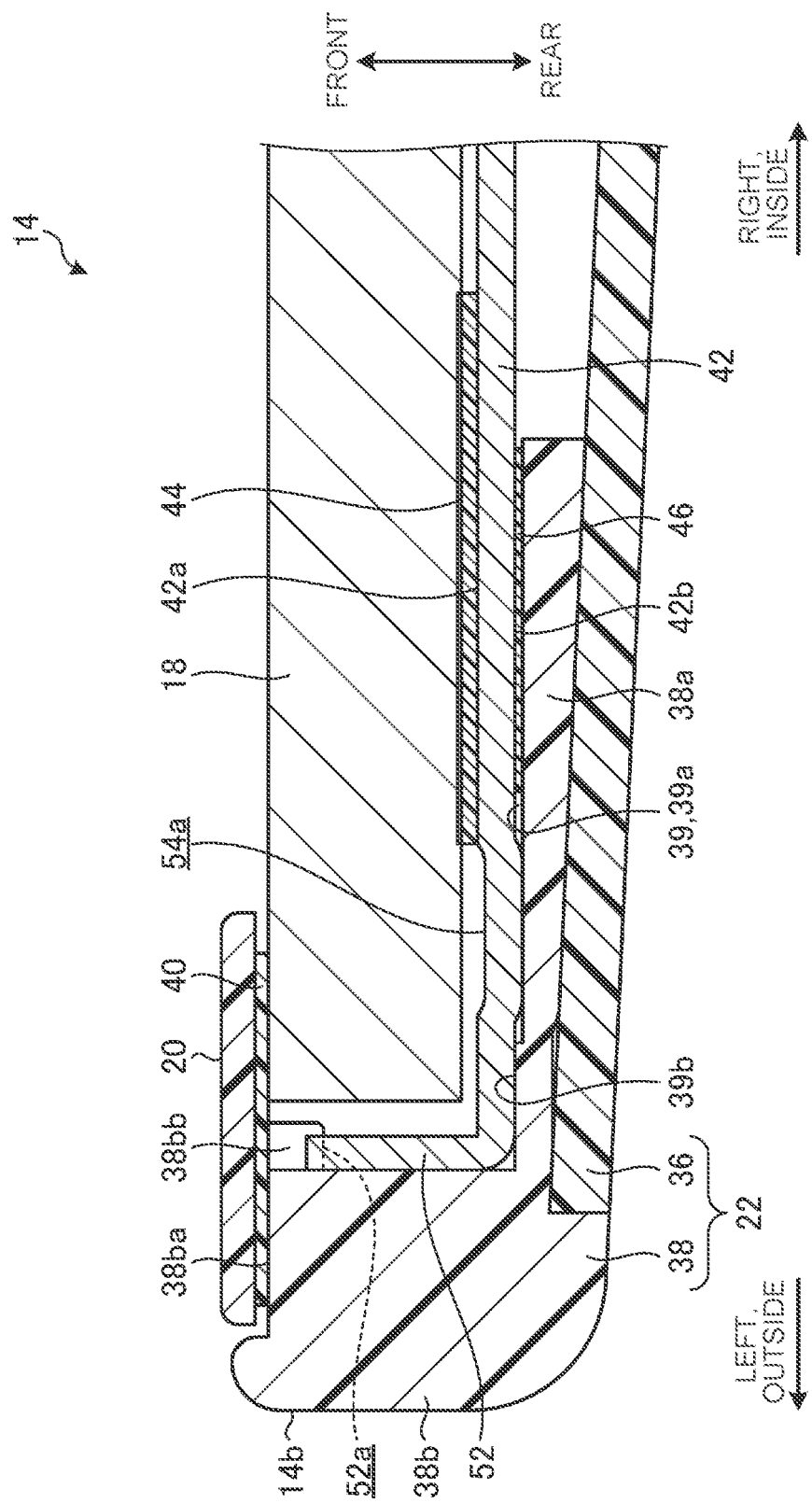
FIG. 7 is a cross-sectional view taken along the line VII-VII of FIG. 4.
Figure 8:
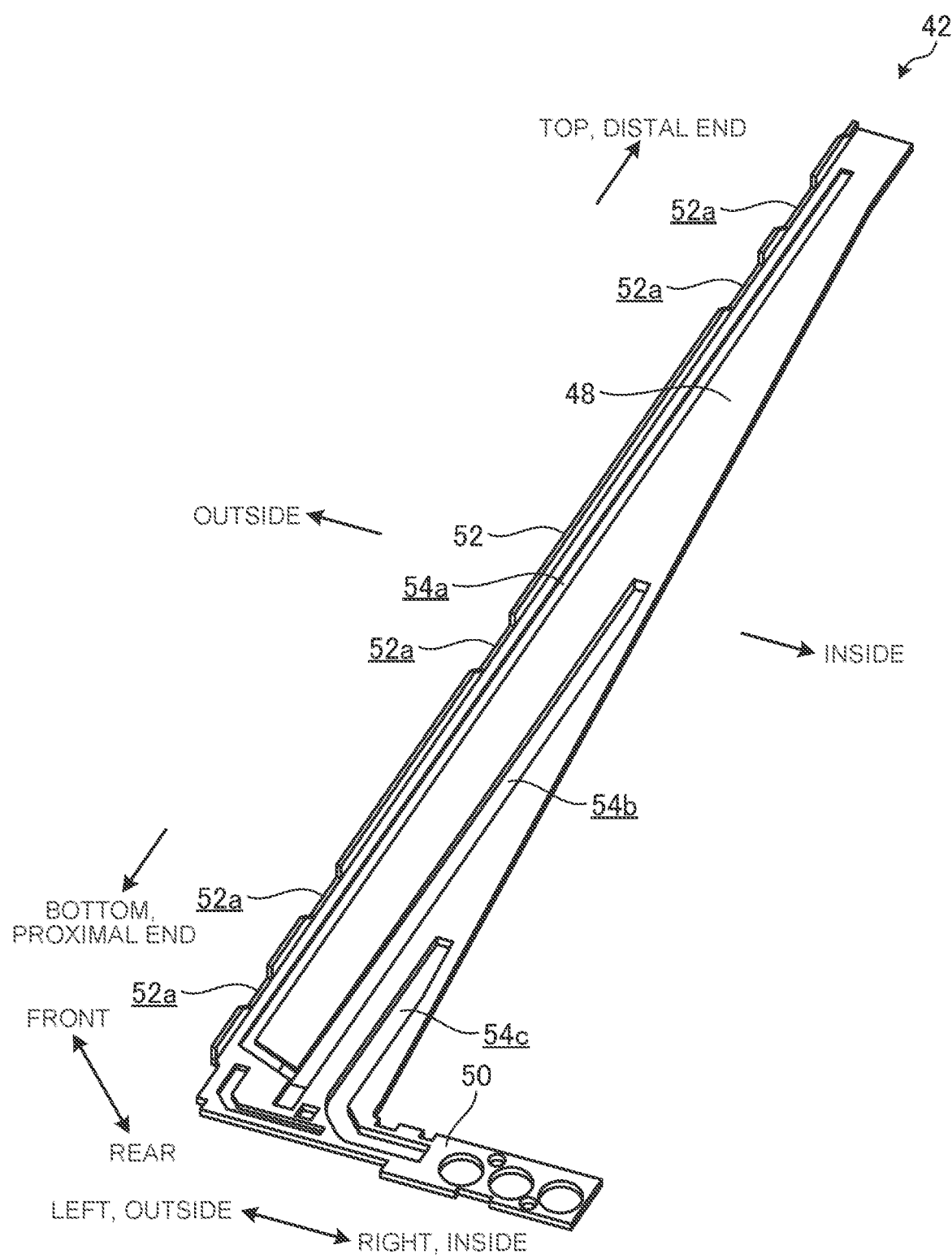
FIG. 8 is a perspective view of one of the reinforcing plates.

FIG. 5 is a front view of the display chassis 14 with the display 18, the front frame 20, and the display controller 24 removed. FIG. 6 is a partially enlarged and exploded perspective view of the display chassis 14. FIG. 7 is a cross-sectional view taken along the line VII-VII of FIG. 4. FIGS. 6 to 8 illustrate the configuration or components on the left part of the display chassis 14, and the detailed descriptions on the right part will be omitted because they are horizontally symmetrical.

The hinge 12 has a shaft 12a, a display-side connecting plate (connecting plate) 12b, and a main body-side connecting plate 12c. The main body-side connecting plate 12c is placed on the left in FIG. 6, that is, on the outside. The display-side connecting plate 12b is placed on the right in FIG. 6, that is, on the inside. In other words, the display-side connecting plate 12b is located inside of the display chassis 14 so as not to overlap with the side edge 14b. The main body-side connecting plate 12c is connected to a connecting seat (not illustrated) in the main body chassis 16. The display-side connecting plate 12b is connected to a connecting seat 32 placed at the connection edge 14a of the back cover 22 with three screws 34. The connecting seat 32 has three screw holes 32a arranged laterally at the positions corresponding to the screws 34. The connecting seat 32 is located at the position of the display-side connecting plate 12b so as not to overlap with the left end. The connecting seat 32 is located very close to the connecting edge 14a due to the thinning of the front frame 20.

In this way, the display chassis 14 can be made thinner at the left end because it does not have the connecting seat 32 and the display-side connecting plate 12b there. The hinge 12 has a friction mechanism that allows the main body chassis 16 and the display chassis 14 to keep any angle therebetween. In this embodiment, the hinge 12 is a single-axis type, but a two-axis type is also possible. The hinge 12 may rotatably connect the main body chassis 16 and the display chassis 14.

The back cover 22 has a main plate 36 that covers substantially the entire rear face of the display 18, and an injection-molded resin frame 38 around the main plate 36. As described above, the back cover 22 has a curved shape, and this curved shape is located mainly at a part of the main plate 36. In one example, the main plate 36 is made of carbon fiber reinforced plastics (CFRP). In one example, the injection-molded plastic frame 38 is made of glass fiber reinforced plastics (GFRP). The injection-molded resin frame 38 is insert-molded to be integrated with the main plate 36.

The main plate 36 has a large area and has a curved shape, and has a simple shape like a thin plate as compared with the injection-molded resin frame 38. The CFRP main plate 36 is thin, but has high strength compared with the GFRP injection-molded plastic frame 38. The injection-molded resin frame 38 has a somewhat complicated shape including the above-mentioned connecting seat 32 as well as a flat surface 39, an engaging protrusion 38bb, and a recess 38bc, which will be described later, and having a bottomed hole for weight reduction and a device mounting structure. Therefore GFRP, which is highly moldable, is used. In this way, the back cover 22 is made of two different materials depending on the positions with consideration given to the cost, shape, moldability, and the like. The injection-molded resin frame 38 may be made of a material that has better moldability than the material of the main plate 36. The main plate 36 may be made of a material that has higher strength than the material of the injection-molded resin frame 38. The main plate 36 may be made of metal.

The injection-molded resin frame 38 has a frame part 38a (see FIG. 7) that is integrally fixed to the edge of the main plate 36 by injection molding, and an edge wall 38b that rises forward from the outer edge of the frame part 38a. The frame part 38a has the flat surface 39 on the front.

The flat surface 39 extends along the side edge 14b, is parallel to the rear face of the display 18, and has a moderate width. The injection-molded resin frame 38, which is made of GFRP, has excellent moldability. Its flat surface therefore can be molded accurately flat. In this embodiment, as illustrated in FIG. 7, the flat surface 39 includes a first flat surface 39a and a second flat surface 39b that are slightly different in height in accordance with the thickness of adhesive tape 46 and the protrusion of a stiffening groove 54a, which will be described later. Under some design conditions where the thickness of the adhesive tape 46 and the stiffening groove 54a do not need to be considered particularly, the flat surface 39 may be a single surface.

The edge wall 38b also has a flat front surface 38ba, to which the front frame 20 is fixed with adhesive tape 40. The front frame 20 is fixed to from the front surface 38ba to the edge of the display 18 with the adhesive tape 40. A plurality of engaging protrusions 38bb slightly protrude inward from the front end of the edge wall 38b. At a corner 14d of the back cover 22, where the side edge 14b and the top edge 14c intersect, the injection-molded resin frame 38 has a recess 38bc (see FIG. 12) that opens downward and forward.

The display chassis 14 includes a pair of reinforcing plates 42 extending along the side edges 14b. Each reinforcing plate 42 has a front face 42a fixed to the rear face of the display 18 with adhesive tape 44 at the left or right end of the display chassis 14, and has a rear face 42b fixed to the flat surface 39 of the injection-molded resin frame 38 of the back cover 22 with adhesive tape 46. In one example, these reinforcing plates 42 are metal plates or carbon plates and have moderate strength. The reinforcing plates 42 are moderately thin and lightweight.

FIG. 8 is a perspective view of the reinforcing plate 42. The reinforcing plate 42 has an extension part 48 extending to the top edge 14c along the side edge 14b and the edge wall 38b (see FIG. 1), and a proximal end protrusion that protrudes inward from the proximal end of the extension part 48 and is fastened together with the display-side connecting plate 12b to the connecting seat 32 with the three screws 34. The top edge 14c is opposite to the connecting edge 14a. The reinforcing plate 42 extending to the top edge 14c could lead to a good effect of reinforcing the display chassis 14 so as not to bend. Under some design conditions comprehensively considering the strength, the layout and other factors, however, the reinforcing plate 42 may extend to a middle of the side edge 14b.

The proximal end protrusion 50 is fastened together with the display-side connecting plate 12b while being sandwiched between the display-side connecting plate 12b and the connecting seat 32. While the proximal end protrusion 50 protrudes inward, the extension part 48 is located only at a position outside the display-side connecting plate 12b and the connecting seat 32. This suppresses the weight, and does not hinder the placement of other components such as the display controller 24 in the layout.

The extension part 48 extends over the entire length of the side edge 38b of the display chassis 14, and has a shape with a proximal-end part being slightly thicker and becoming tapered toward the distal end. The reinforcing plate 42 has a bent part 52 at the outside end, which is bent 90 degrees toward the front and extends along the side edge 14b, and thus hardly bends. The bent part 52 is stable because it extends along the edge wall 38b while abutting on the edge wall 38b. The bent part 52 has a plurality of shallow engaging grooves 52a at the front edge.

The extension part 48 has three stiffening grooves 54a, 54b, and 54c that slightly protrude rearward. Of the stiffening grooves 54a to 54c, the stiffening groove 54a is located outermost, and the stiffening groove 54c is located innermost. These stiffening grooves 54a to 54c extend in parallel with each other from the vicinity of the proximal end of the extension part 48 toward the distal end. The stiffening grooves 54a to 54c protrude rearward. This means that they do not come into contact with the display 18.

The stiffening groove 54a on the outside extends substantially the entire length of the top-bottom direction of the display chassis 14. The extension part 48 has a shape that tapers toward the distal end, so that the stiffening groove 54b is approximately half the length of the stiffening groove 54a according to the width of the extension part 48, and the stiffening groove 54c is even shorter. An appropriate distance is kept between the stiffening groove 54a and the stiffening groove 54b.

Between the stiffening groove 54a and the stiffening groove 54b, adhesive tape 44 is attached to the front face 42a for fixing to the display 18, and adhesive tape 46 is attached to the rear face 42b for fixing to the flat surface 39. The adhesive tape 44 or 46 is attached over substantially the entire length of the reinforcing plate 42 in the top-bottom direction, and fix the reinforcing plate 42 to the display 18 and the back cover 22.

Figure 9:
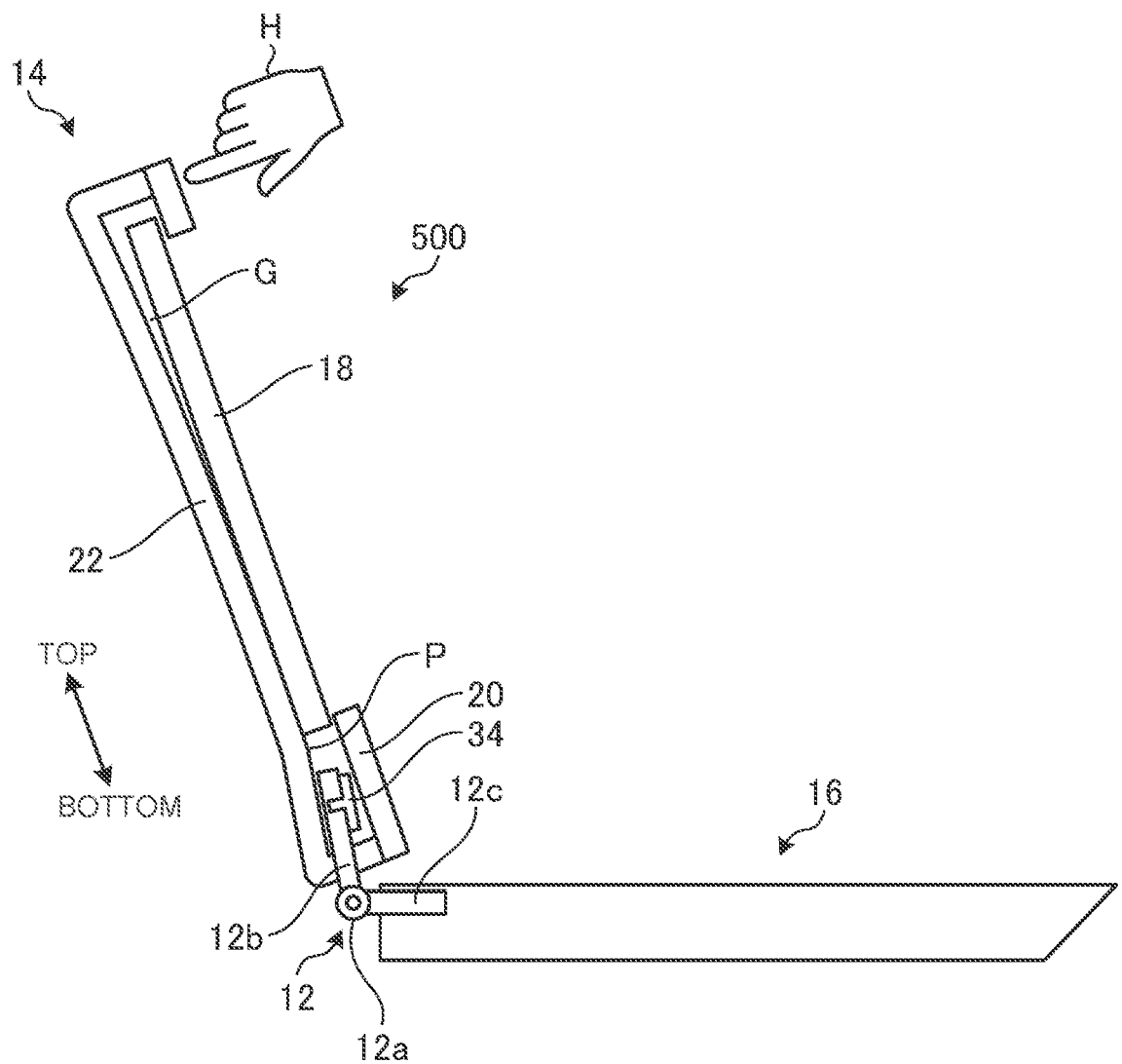
FIG. 9 is a schematic cross-sectional view of an electronic apparatus according to a comparative example.
Figure 10:
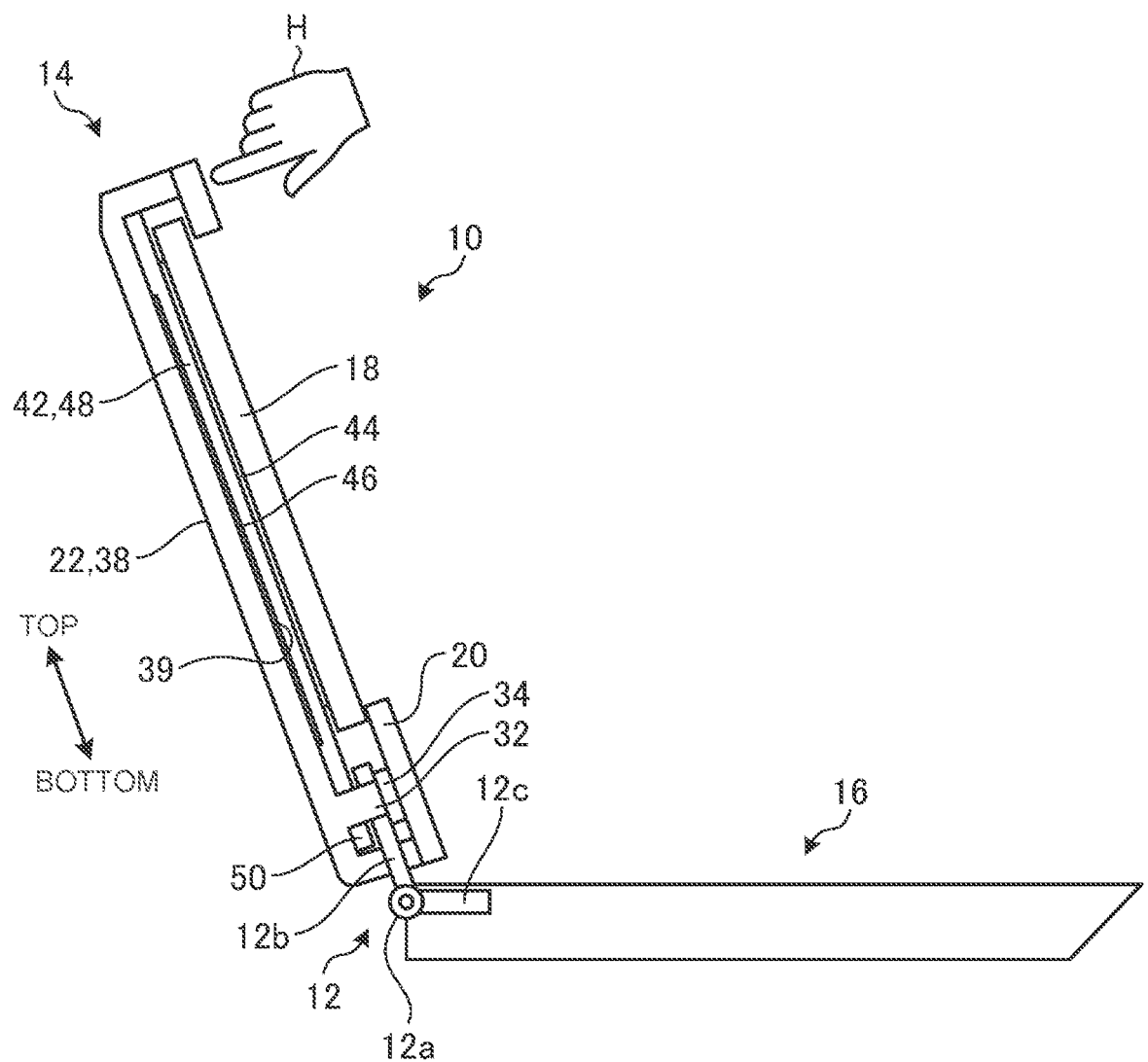
FIG. 10 is a schematic cross-sectional view of the electronic apparatus.

FIG. 9 is a schematic cross-sectional view of an electronic apparatus 500 according to a comparative example. FIG. 10 is a schematic cross-sectional view of the electronic apparatus 10.

As illustrated in FIGS. 9 and 10, when rotating the display chassis 14 relative to the main body chassis 16, the user usually touches the top end of the display chassis 14 with their hand H for movement. The hinges 12 are fixed to some extent because they have a friction mechanism. When the display 18 has a ratio of 16:10, the vertical dimension of the display chassis 14 is longer than that of the specifications of 16:9, and the back cover 22 tends to be thinner.

In this case, if there is no reinforcing plate as in the electronic apparatus 500 of the comparative example illustrated in FIG. 9, and if the back cover 22 and the display 18 are not fixed and they have a gap G therebetween, the back cover 22 is the only component that exerts a strength between the hand H and the hinges 12. The back cover 22 therefore is not strong enough and easily bends. Further, the bent back cover 22 can unevenly press on a portion of the rear face of the display 18, causing stress on the display 18.

When the user touches the top end of the display chassis 14 with the hand H for movement, the stress to bend the display chassis 14 is substantially proportional to the distance from the hand H, the point of action. This means that the force to bend the back cover 22 generates concentrated stress in the vicinity P of the connection with the display-side connecting plate 12b of the hinge 12, which may lead to a concern about the short life of this portion. Also, in this case, the display chassis 14 tends to shake easily due to lack of strength, which degrades the visibility of the display 18.

In contrast, in the electronic apparatus 10 of the present embodiment illustrated in FIG. 10, the display chassis 14 is configured so that the back cover 22, the reinforcing plates 42, and the display 18 are integrally fixed without gaps. This means that these three members cooperatively function as a member that exerts a strength, from which sufficient strength is obtained and bending hardly occurs. In particular, the reinforcing plates 42 each have the bent part 52 and the stiffening grooves 54a to 54c, and thus have high strength and hardly bend. In this case, the display chassis 14 has appropriate strength and does not easily shake, which leads to excellent visibility of the display 18 and high usability.

The reinforcing plates 42 are fixed to the rear face of the display 18 over the entire length in the top-bottom direction with no gaps and do not apply unbalanced pressure to the display 18, and thus do not cause stress to the display 18. In the example of FIG. 9, the concentrated stress is particularly generated in the vicinity of the connection portion P of the display-side connecting plate 12b. In contrast, in the electronic apparatus 10 of FIG. 10, the display-side connecting plate 12b is fastened together with the proximal end protrusion 50 and the connecting seat 32. This means that the force generated from the friction mechanism of the hinges 12 is distributed over the back cover 22 and the reinforcing plates 42 without generating excessive stress concentration on either one. Therefore, this portion has a long life. Although the stress to bend the display 18 is roughly proportional to the distance from the hand H, the stress will be applied substantially evenly in this embodiment because the reinforcing plate 42 is tapered toward the distal end. This prevents the lack of strength or being excessively strong at any part. In this way, the electronic apparatus 10 suppresses the bending of the display chassis 14 and achieves a long life.

Figure 11:
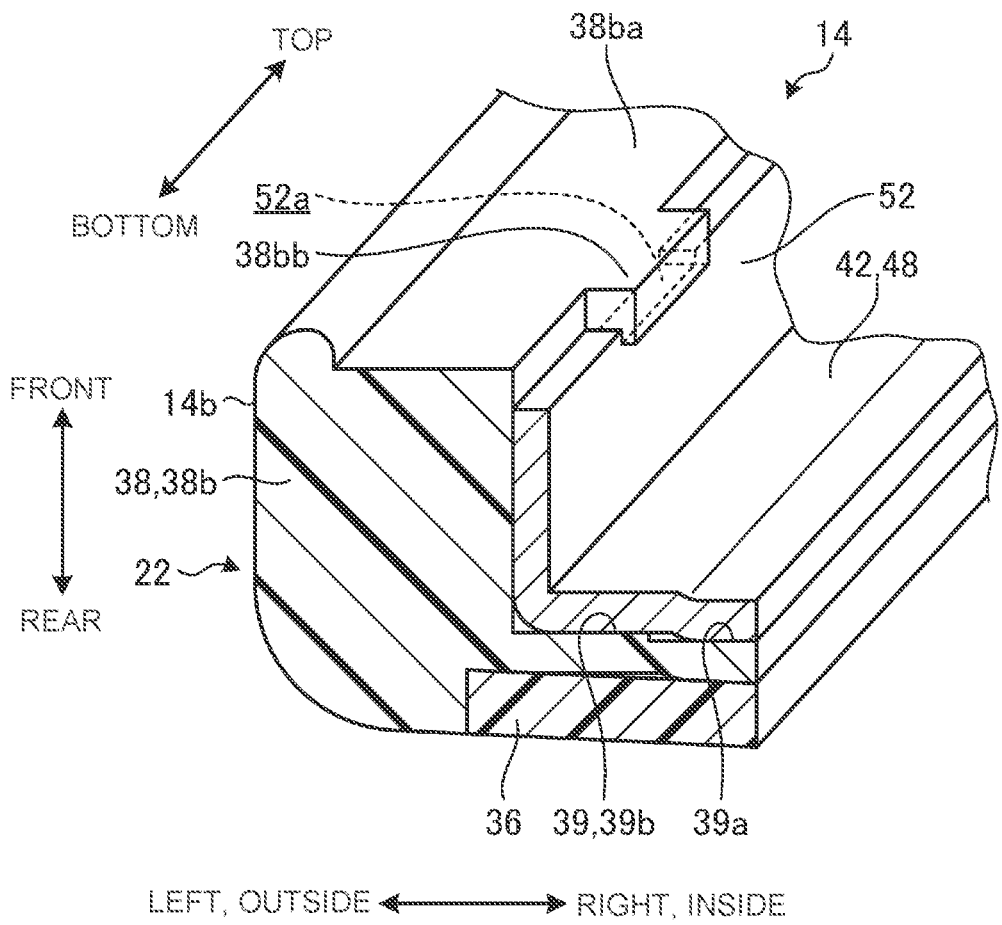
FIG. 11 is a partially enlarged perspective view of the display chassis in cross section at the left edge.
Figure 12:
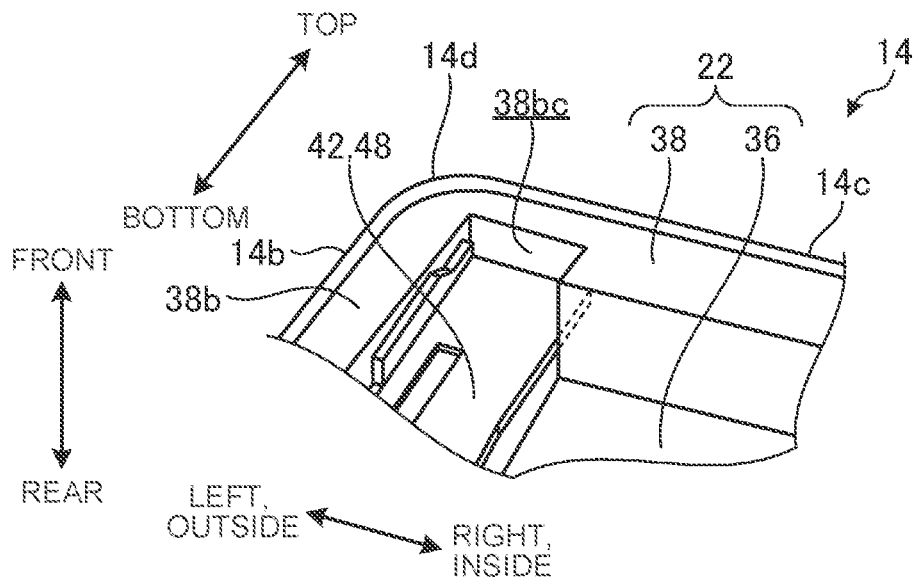
FIG. 12 is a partially enlarged perspective view of the display chassis at the top left corner.

FIG. 11 is a partially enlarged perspective view of the display chassis 14 in cross section at the left edge. FIG. 11 and the following FIG. 12 illustrate the display chassis 14 without the display 18 and the front frame 20. As illustrated in FIG. 11, the engaging protrusion 38bb protruding inward at the front end of the edge wall 38b engages with the engaging groove 52a at the front edge of the bent part 52. A plurality of these engaging parts each including the combination of the engaging protrusion 38bb and the engaging groove 52a are placed along the edge wall 38b of the display chassis 14 with appropriate intervals (see FIG. 6). This allows each reinforcing plate 42 to be easily and accurately positioned stably in the front-rear direction.

FIG. 12 is a partially enlarged perspective view of the display chassis 14 at the top left corner. As illustrated in FIG. 12, the distal end of the reinforcing plate 42 fits into the recess 38bc at the corner 14d with almost no gap. This allows the distal end of the reinforcing plate 42 to be easily and accurately positioned stably in the left-right direction.

The present disclosure is not limited to the above-described embodiment, and can be modified freely without deviating from the scope of the present disclosure.

The invention claimed is:

1. An electronic apparatus comprising:
a main body chassis; and
a display chassis, the display chassis and the main body chassis being rotatably connected at respective connecting edges thereof via a hinge, wherein
the display chassis includes:
  a display having a display surface and a rear face, the display surface facing in a front direction,
  a back cover that covers the rear face of the display and includes a single main plate that substantially covers the entire rear face and has a curved shape that is convex toward a rear direction, and
  a pair of reinforcing plates extending along side edges of and on opposite sides of the display chassis, each reinforcing plate having a proximal end that is fixed to the back cover and to a connecting plate of the hinge at the connecting edge of the display chassis, and having a front face fixed to the display and a rear face fixed to the back cover.

2. The electronic apparatus according to claim 1, wherein the back cover further includes:
an injection-molded resin frame around the main plate, the injection-molded resin frame including a material different from a material of the main plate,
wherein
the injection-molded resin frame has a flat surface along the side edges of the display chassis and is parallel to the rear face of the display, and
the reinforcing plates are fixed to the flat surface.

3. The electronic apparatus according to claim 1, wherein the reinforcing plates extend to a top edge of the back cover, the top edge being opposite to the connecting edge.

4. The electronic apparatus according to claim 3, wherein the back cover has a recess at each corner where side edges thereof and a top edge thereof intersect, each recess being open in a direction toward the connecting edge and the front direction, a distal end of each reinforcing plate being fitted into a corresponding recess.

5. The electronic apparatus according to claim 1, wherein each reinforcing plate has a shape that tapers toward a distal end thereof.

6. The electronic apparatus according to claim 1, wherein the connecting plate is inside of the display chassis to not overlap with a side edge of the display chassis, and
each reinforcing plate has:
  an extension part that extends along the side edge of the display chassis, and
  a proximal end protrusion that protrudes inward from a distal end of the extension part to be fixed with the connecting plate.

7. The electronic apparatus according to claim 1, wherein the back cover has an edge wall that stands forward along the side edge of the display chassis, and
each reinforcing plate has a bent part that is bent forward by 90 degrees and extends along the edge wall while abutting the edge wall.

8. The electronic apparatus according to claim 7, wherein the edge wall has an engaging protrusion that engages an engaging groove in a front edge of the bent part.

* * * * *